United States Patent [19]
Morii et al.

[11] Patent Number: 6,141,078
[45] Date of Patent: *Oct. 31, 2000

[54] IPS TYPE LIQUID CRYSTAL DISPLAY APPARATUS HAVING IN-PLANE RETARDATION VALUE OF LESS THAN ZERO AND NOT MORE THAN 20

[75] Inventors: Yasuhiro Morii; Fumio Matsukawa; Akira Tsumura; Shin Tahata; Masaya Mizunuma; Akira Tamatani; Masayuki Fujii, all of Tokyo; Yasuo Fujita, Kumamoto, all of Japan

[73] Assignees: Mitsubishi Denki Kabushiki Kaisha, Tokyo; Advanced Display, Inc., Kumamoto, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/237,664

[22] Filed: Jan. 27, 1999

[51] Int. Cl.⁷ .................. G02F 1/1339; G02F 1/1343
[52] U.S. Cl. .................. 349/155; 349/141; 349/156
[58] Field of Search .................. 349/155, 156, 349/141, 153

[56] References Cited

U.S. PATENT DOCUMENTS

| | | | |
|---|---|---|---|
| 5,078,475 | 1/1992 | Sekimura et al. | 349/155 |
| 5,220,446 | 6/1993 | Rho | 349/155 |
| 5,493,429 | 2/1996 | Kanemoto et al. | 359/68 |
| 5,537,235 | 7/1996 | Ishihara et al. | 359/81 |
| 5,615,031 | 3/1997 | Saiuchi et al. | 349/149 |
| 5,739,888 | 4/1998 | Ogura et al. | 349/153 |
| 5,926,242 | 7/1999 | Kataoka et al. | 349/117 |
| 5,982,471 | 11/1999 | Hirakata et al. | 349/155 |

FOREIGN PATENT DOCUMENTS

| | | |
|---|---|---|
| 2-220032 | 9/1990 | Japan . |
| 4-153625 | 5/1992 | Japan . |
| 6-160878 | 6/1994 | Japan . |
| 9-127548 | 5/1997 | Japan . |
| 9-146108 | 6/1997 | Japan . |
| 9-152625 | 6/1997 | Japan . |
| 9-171194 | 6/1997 | Japan . |

*Primary Examiner*—William L. Sikes
*Assistant Examiner*—Tarifur R. Chowdhury
*Attorney, Agent, or Firm*—Oblon, Spivak, McClelland, Maier & Neustadt, P.C.

[57] ABSTRACT

The liquid crystal display apparatus of present invention includes a TFT array substrate on which there are formed scanning signal lines, image signal lines, thin film transistors, liquid crystal driving electrodes, common electrodes and common signal lines, a counter substrate which opposes the TFT array substrate, primary spacers for maintaining a gap between both substrates constant, secondary spacers for maintaining a gap in peripheral portions of both substrates constant, a seal member which is interposed in the gap between both substrates together with the secondary spacers and which adhere peripheral portions of both substrates, and a liquid crystal layer, wherein the in-plane retardation of the display apparatus $(\Delta n)\cdot(d_{max}-d_{min})$ is not less than 0 nm and not more than 20 nm, whereby variations in colors occurring in liquid crystal display apparatuses of IPS type which are due to unevenness of liquid crystal layers can be eliminated.

11 Claims, 14 Drawing Sheets

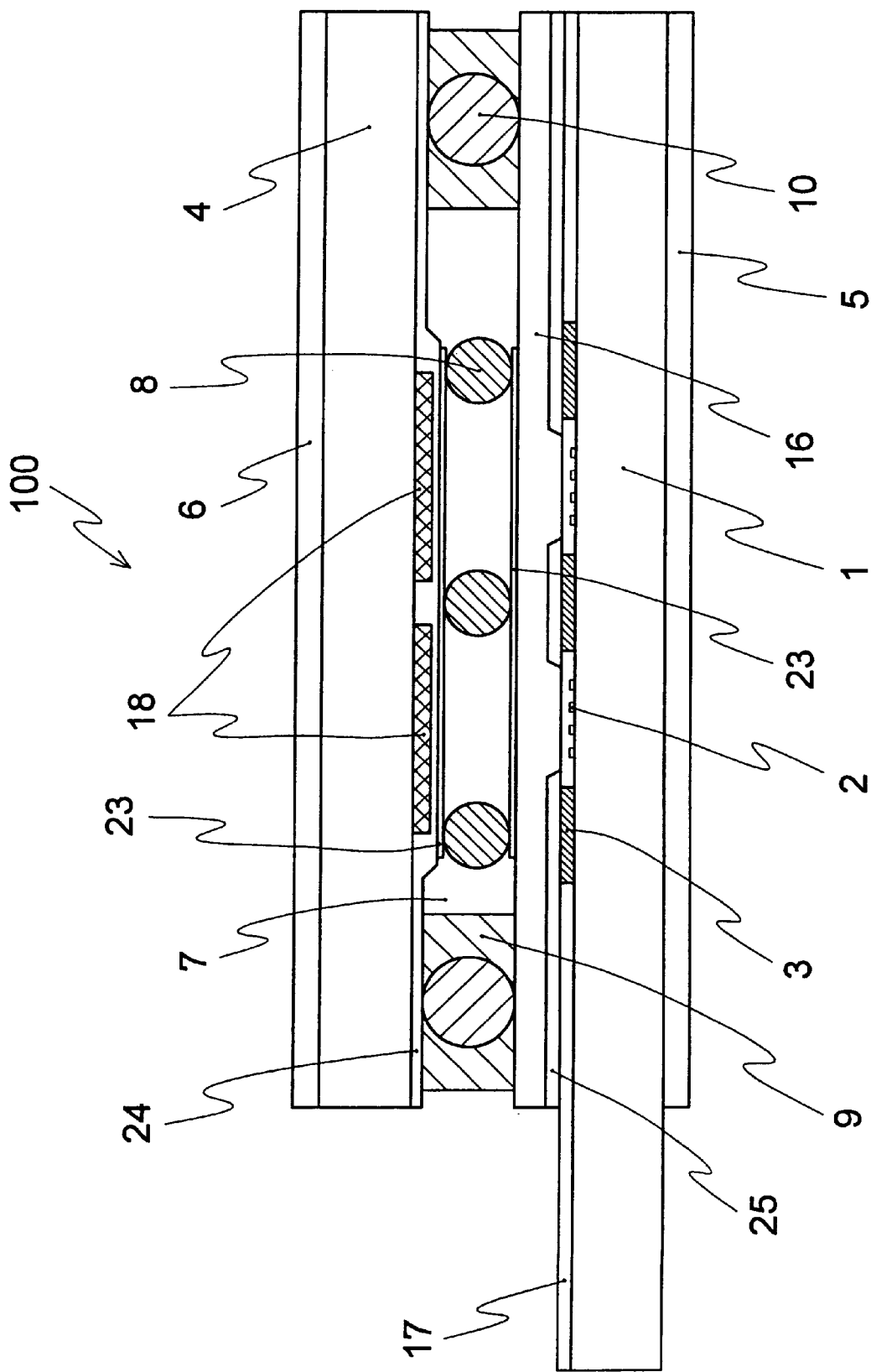

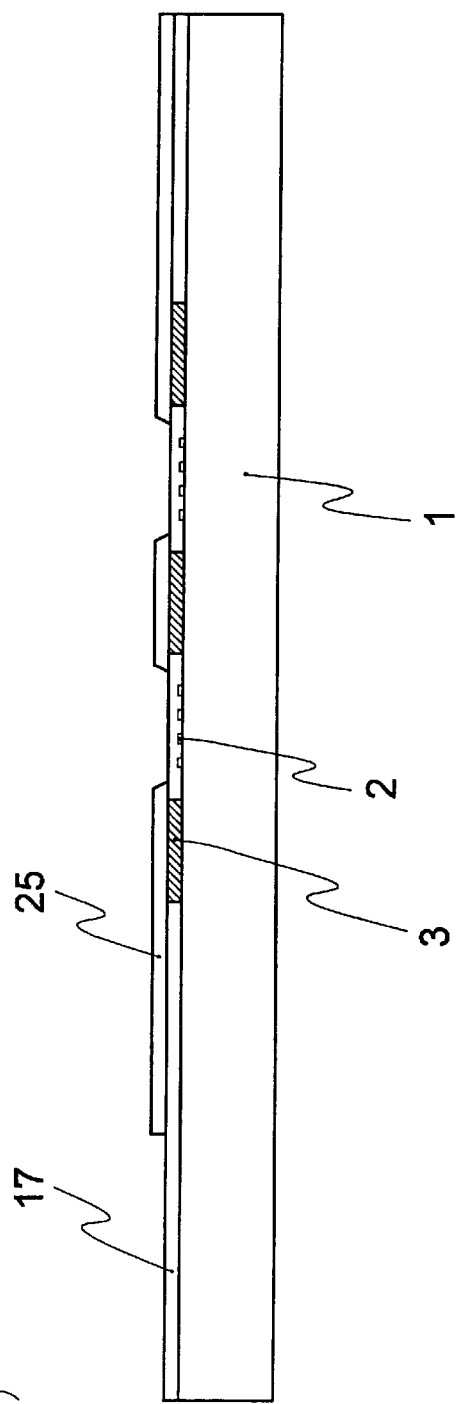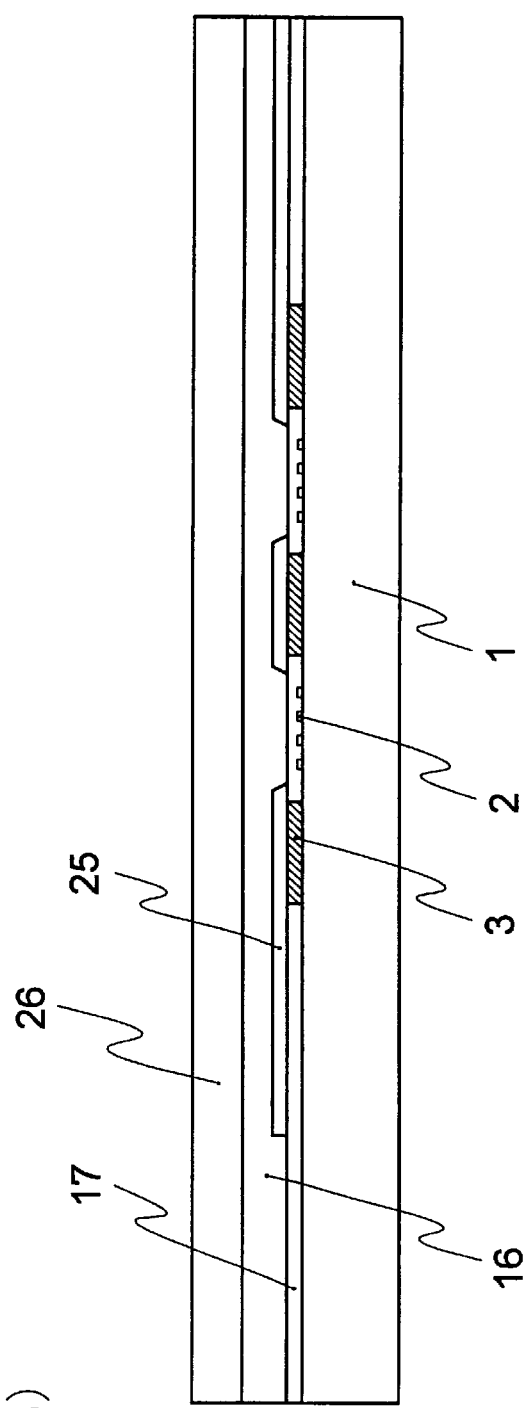

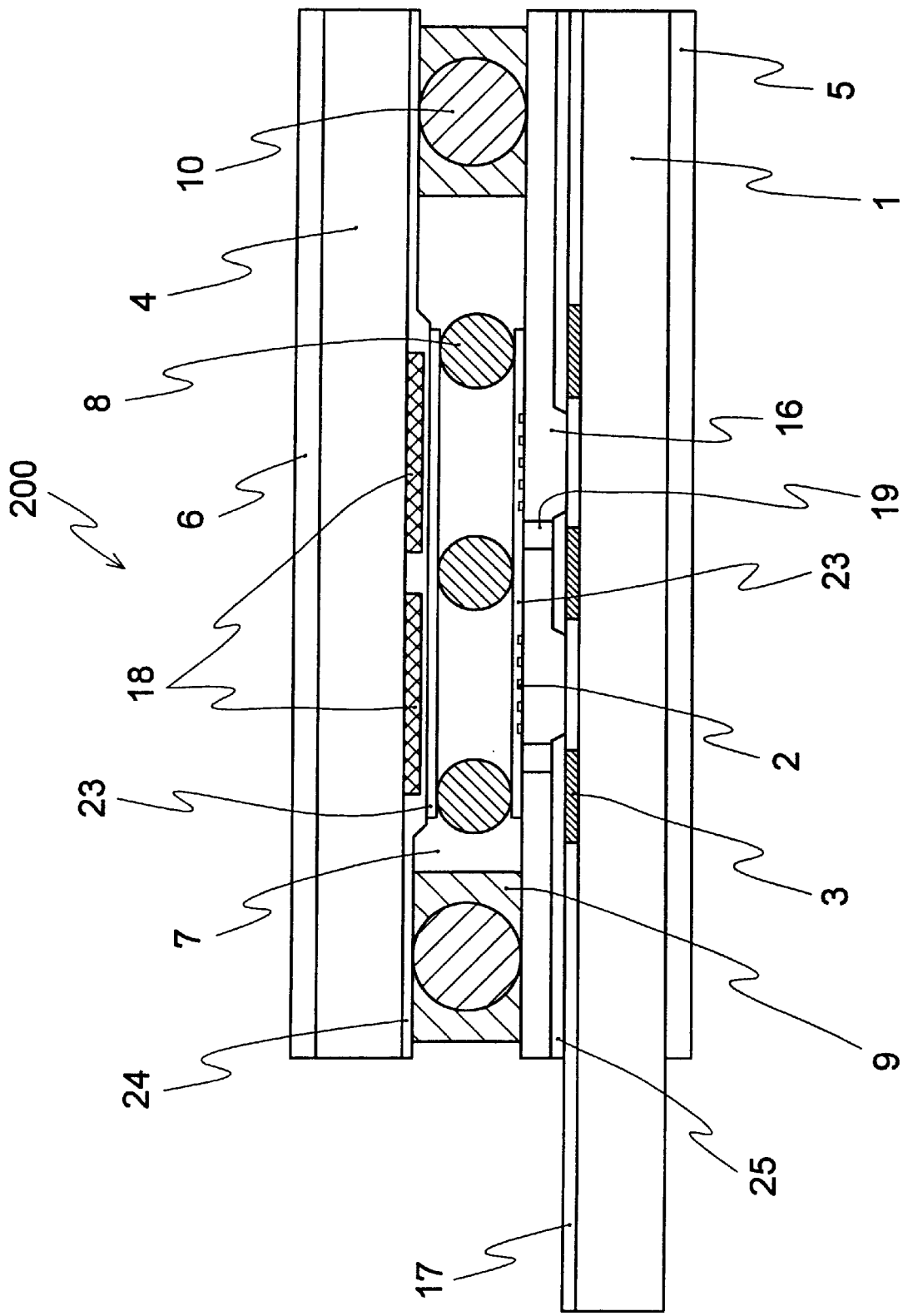

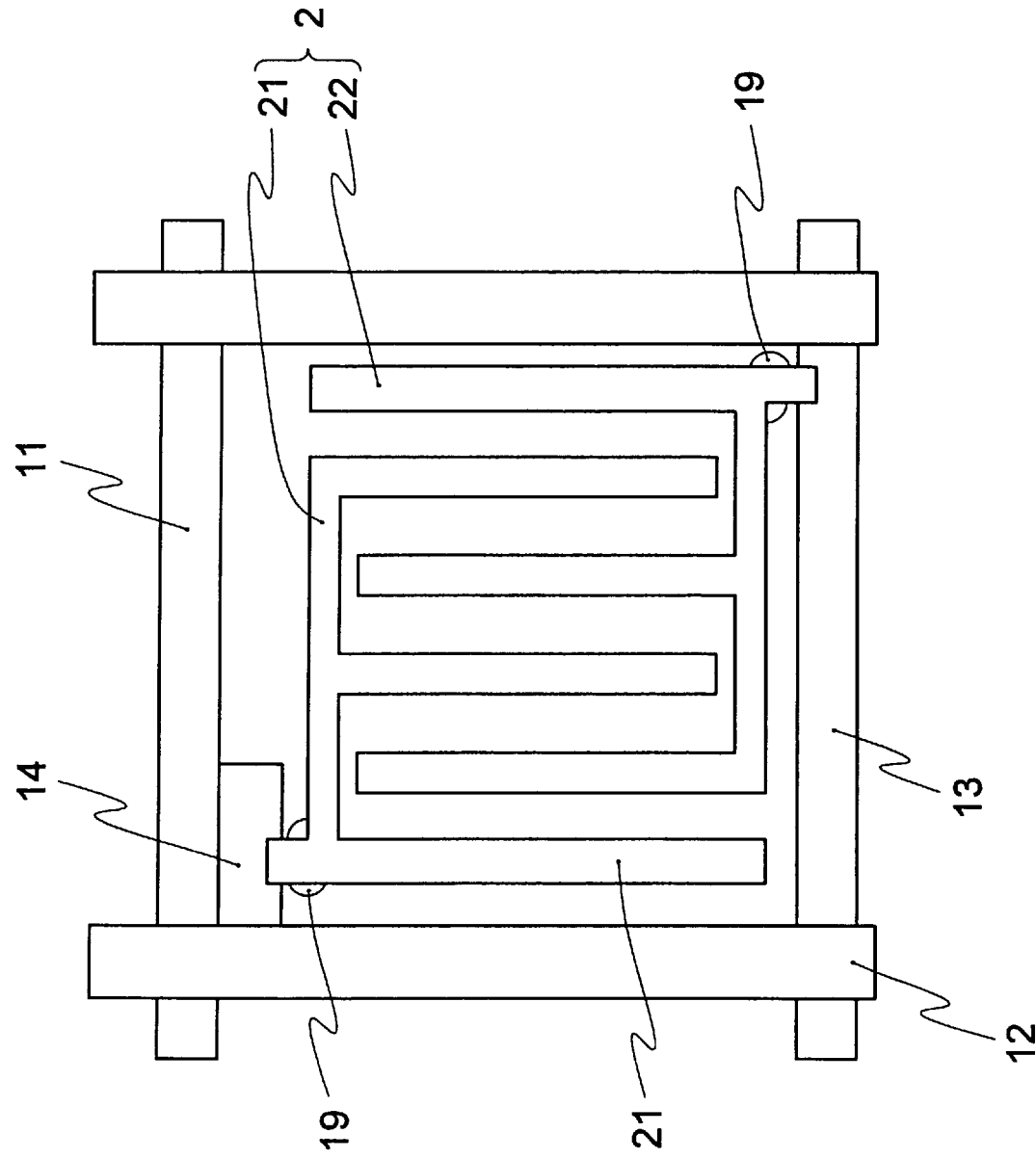

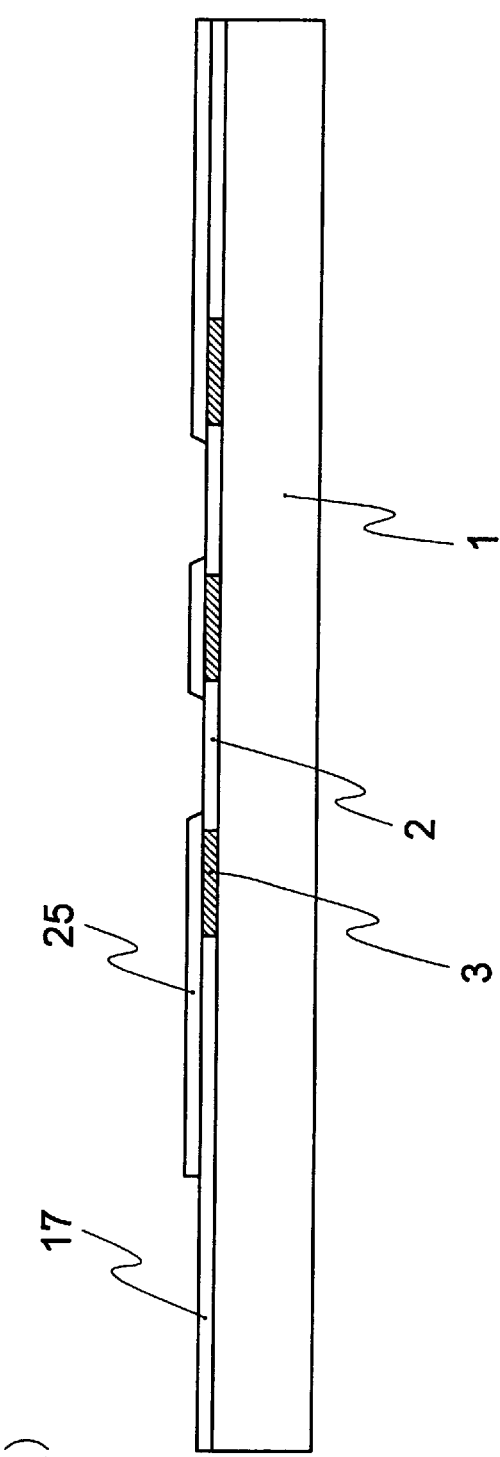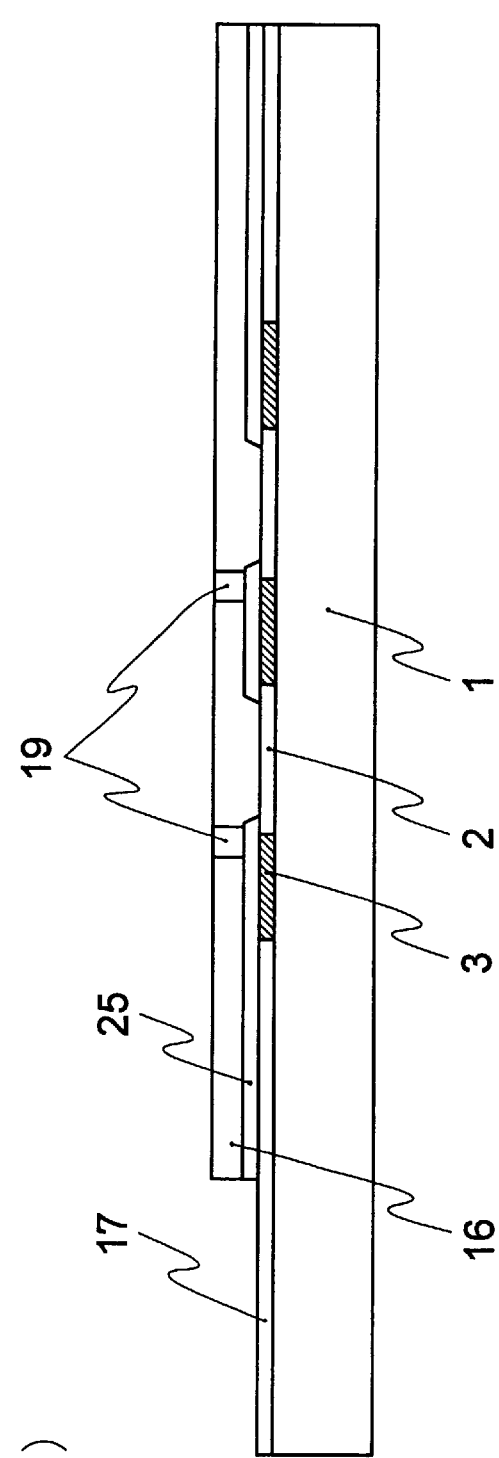

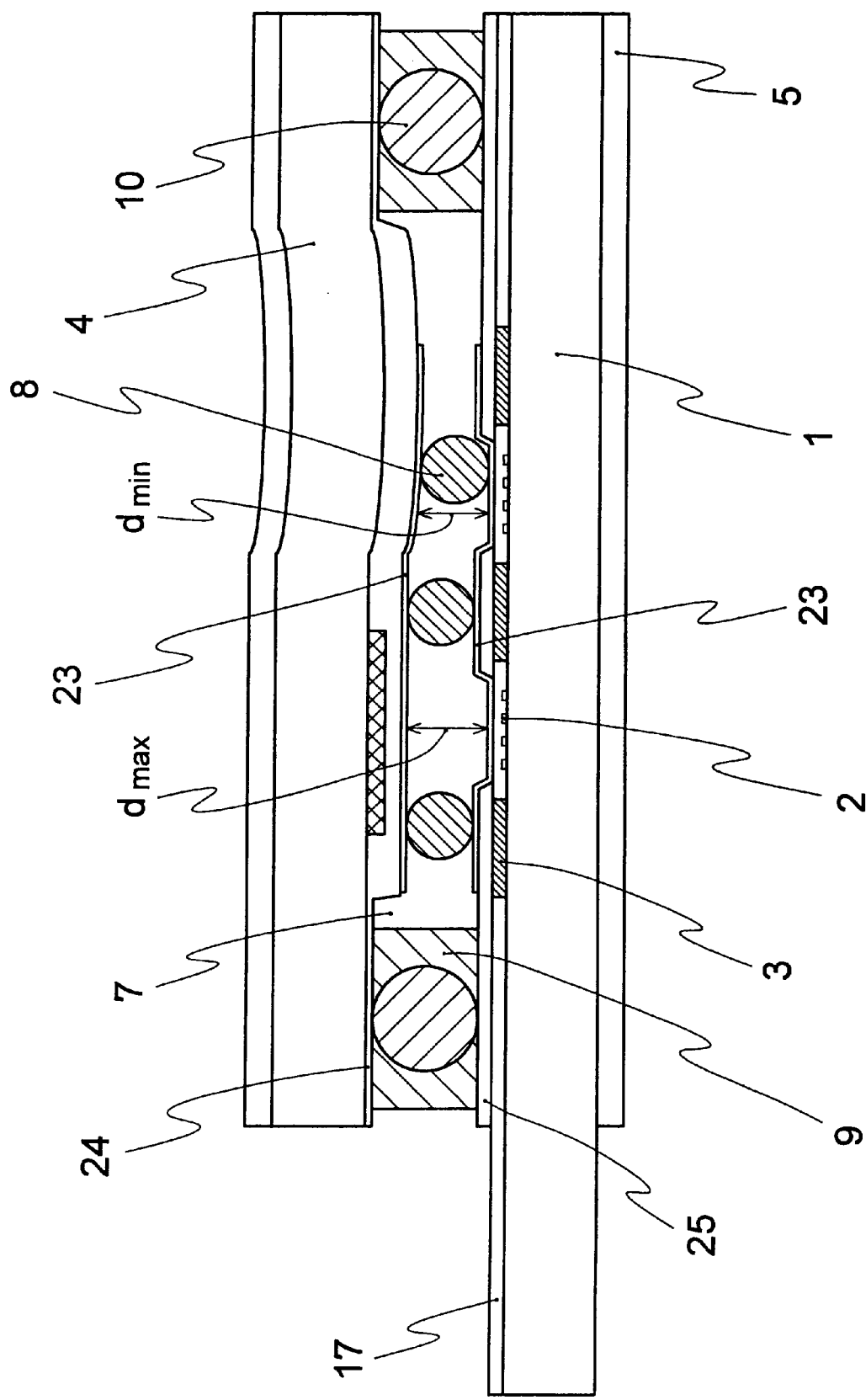
PRIOR ART FIG.14

IPS TYPE LIQUID CRYSTAL DISPLAY APPARATUS HAVING IN-PLANE RETARDATION VALUE OF LESS THAN ZERO AND NOT MORE THAN 20

BACKGROUND OF THE INVENTION

The present invention relates to an in-plane switching type liquid crystal display apparatus. More particularly, the present invention relates to an in-plane response type liquid crystal display apparatus which is obtained by adhering two substrates of which at least electrodes on one side thereof are of a comb-like shape on at least one side thereof and enclosing liquid crystal therein, wherein it is arranged such that irregularities in colors can be eliminated and display property improved.

In contrast to twisted nematic display methods wherein an electric field is applied on liquid crystal in a direction vertical with respect to a substrate, developments are being made in these years employing display methods in which an electric field is applied in a direction substantially parallel with respect to a substrate. For instance, Japanese Unexamined Patent Publication No. 225388/1995 discloses an example of a liquid crystal display apparatus employing such a display method in which an electric field is applied in a direction substantially parallel with respect to a substrate, in which it is referred to that the gap between substrates is set to be not more than 6 μm or that the retardation, which will be described below in details, to be not less than 0.21 μm and not more than 0.36 μm in order to improve the response speed.

The inventors of the present invention have defined the above described liquid crystal display apparatus employing a display method in which an electric field is impressed in a direction substantially parallel with respect to a substrate as an in-plane switching liquid crystal display apparatus (hereinafter referred to as "IPS panel").

FIG. 11 is a partial sectional explanatory view of a conventional in-plane switching type liquid crystal display apparatus. In the drawings, only two pixels have been partially shown for ease of explanation (and this also applies to all drawings hereafter). FIG. 12 is a plan explanatory view of one pixel in a conventional IPS panel. FIG. 13 is a sectional explanatory view taken along line X-Y of FIG. 11. In FIG. 11, FIG. 12, and FIG. 13, numeral 1 denotes a TFT array substrate, numeral 2 pixel electrodes, numeral 3 TFT portions, and numeral 4 a counter substrate. The surface of the TFT array substrate 1 is provided with electrodes which are of comb-like shape. Each of the pixel electrodes 2 is comprised of a comb-like liquid crystal driving electrode 21 and a comb-like common electrode 22 at least a part of which is formed to oppose the liquid crystal driving electrode. TFT portion 3 is a generic term for thin film transistors (hereinafter referred to as "TFT") 14 for writing image signals to the liquid crystal driving electrodes 21, and signal cables for supplying image signal cables 12, scanning signal cables 11, or common electrodes 22 with signals. The counter substrate 4 is arranged to oppose the TFT array substrate 1. Materials for forming the pixel electrodes 2 may be any one selected from among chrome, aluminum, indium tin oxide (hereinafter referred to as "ITO"). Numeral 25 denotes an insulating film. The counter substrate 4 is not required to be provided to be with electrodes on the surface thereof in case of IPS panels performing colored display, and is generally provided with a flag portion (not shown) formed of metal or resin and a color filter substrate with coloring layers 18 of red, green and blue. In order to prevent the coloring layers 18 from melting to the exterior, a protecting film 24 is formed on the counter substrate 4. Numeral 17 denotes electrodes for writing in image signals, scanning signals or common signals from the substrate exterior. Numeral 7 denotes liquid crystal, and the thickness thereof is represented as d. Further, numeral 15 in FIG. 13 denotes one molecule within the liquid crystal layer. Numeral 9 is a seal member for connecting the TFT array substrate 1 to the opposing substrate 4, numeral 10 secondary spacers contained in the seal member, and numerals 5 and 6 polarizer. Numeral 23 denotes an alignment layer for aligning the liquid crystal 7. Further, in FIG. 13, $I_0$ denotes incident light, I outgoing transmitted light, T transmittance axis, D aligning direction, and E electric field.

The basic arrangement of the IPS panel will be explained with reference to FIG. 11. In the basic arrangement of the IPS panel, the TFT array substrate 1 and counter substrate 4 are opposed in a parallel manner, connected by seal member 9, and liquid crystal 7 is interposed between the TFT array substrate 1 and the counter substrate 4. Alignment treatments have been performed for the orientation film 23 (detailed descriptions thereof will be described later). Primary spacers 8 are dispersed within the seal surface for maintaining the gap d between the TFT array substrate 1 and the counter substrate 4 constant, and secondary spacers 10 are disposed by mixing them into the seal member 9.

While it has been defined in the prior art as disclosed in the above mentioned Japanese Unexamined Patent Publication No. 225388/1995 that the gap between the substrates shall not be more than 6 μm, there is made neither any reference to secondary spacers 10 as shown in FIG. 11 which are known in the art by the inventors of the present invention nor to making the gap between the substrates constant. This is considered to be due to the fact that it had not been recognized of the connection of these with improving irregularities in colors of display which is a subject of the present invention as it will be described in details hereafter.

The operational theory of the IPS panel will now be explained with reference to FIG. 13. As noted in the above explanation of the basic arrangement, the TFT array substrate 1 and counter substrate 4 are opposed in a parallel manner. In case the liquid crystal 7 is liquid crystal of positive anisotropy of dielectric constant, liquid crystal molecules 15 are disposed such that the longitudinal axes thereof are parallel with respect to the substrate surface and such that they are also substantially parallel with respect to the electrodes. For this disposing method, known rubbing methods are generally used, and in case rubbing is performed for the alignment layer 23 in a direction substantially parallel to the electrodes, the liquid crystal molecules 15 assume the above described alignment. In this manner, the polarizer 5 is disposed such that the transmission axis thereof is parallel with respect to the aligning direction, and the polarizer 6 as to be orthogonal to the transmission axis of the polarizer 5.

In case the electric field is OFF, light that has passed through the polarizer 5 reaches the second polarizer 6 along the alignment of the liquid crystal molecules 15. Light can not path through since, as noted above, the transmission axis of the polarizer 6 is orthogonal to the transmission axis of the polarizer 5. In case the electric field is ON, that is, an electric field has been generated in a horizontal direction with respect to the substrate between the liquid crystal driving electrodes 21 and common electrodes 22 which have been formed to as to oppose the former, the longitudinal axis of the liquid crystal molecules rotates in a parallel manner with respect to the substrates along a direction of the electric field which is due to the anisotropy of dielectric constant of the liquid crystal. At this time, the transmitted light changes from a linear polarized light to an elliptical polarization (the elliptical polarization is schematically shown on the counter substrate 4 in FIG. 13 on the right-hand side thereof due to birefringence effects, and passes through the polarizer 6.

In this manner, the IPS panel employs the birefringence effect. The birefringence effect is generally called an ECB (electrically controlled birefringence) effect (hereinafter referred to as "IPS mode"). Since the liquid crystal molecules comprise a refractive index of ordinary light $n_o$ and a refractive index of extraordinary light $n_e$, there exists an anisotropy of refractive index $\Delta n = n_e - n_o$. The presence of $\Delta n$ in the liquid crystal molecules causes birefringence effects.

In the ISP panel, the liquid crystal molecules 15 are aligned as to be uniformly directed in one direction parallel to the substrate as shown in FIG. 13. Such a condition of alignment is called a homogeneous alignment. The intensity of transmission light I of light outgoing from polarizer 6 in case the polarizers 5, 6 have been disposed as shown in FIG. 11 by employing homogeneous alignment is given by the following equation.

$$I = I_o \sin^2(\pi R/\lambda)$$

where $I_o$ represents intensity of light incident on the polarizer 5, $\lambda$ represents wavelength, and R represents retardation which is obtained by multiplying an optical-path difference between ordinary light and extraordinary light by thickness of the liquid crystal (($\Delta n$)·d). That is, the intensity of light which is outgoing from the polarizer 6 is given by a function of wavelength $\lambda$, of incident light and retardation R. Thus, variations in thickness d of the liquid crystal 7 cause variations in outgoing light intensity, that is, transmission light I.

In the theory of a conventional IPS mode as described above, variations occur in outgoing transmission light owing to variations in thickness of the liquid crystal layer. Variations in outgoing transmission light I causes variations in colors of display (hereinafter referred to as "irregularities of colors"). Measures had already been taken in the prior art for eliminating variations in thickness of liquid crystal layers, one of which is disclosed in Japanese Unexamined Publication No. 286176/1996, wherein a planation layer of transparent resin 17 is provided on the color filter for planation of the surface, and also Japanese Unexamined Patent Publication No. 225388/1995 discloses such a provision of a flatting layer on the color filter, and it is considered that such a flatting layer is effective in making the thickness of the liquid crystal layer uniform.

However, the inventors of the present invention have found out, as it will be discussed in details hereafter, that it is impossible to decrease variations in thickness of a liquid crystal layer even in a conventional arrangement in which spacers have been provided between two substrates, and much less is it possible to accurately make the thickness of the liquid crystal layer uniform by using a planation layer as disclosed in the above publications (Japanese Unexamined Patent Publication No. 286176/1996 and Japanese Unexamined Patent Publication No. 225388/1995). Problematic points of conventional IPS panels will now be explained based on FIG. 14.

There are cases in which the primary spacers 8 are either arranged on the TFT portions 3 or alternatively, on the pixel electrodes 2. Generally, the volumetric ratio of TFT portions 3 and pixel electrodes 2 of a TFT array substrate 1 is approximately 7:3. Therefore, it is often the case that primary spacers 8 on the pixel electrodes 2 determine the thickness of the liquid crystal 7. Thus, it is often the case that $d_{max}$ and $d_{min}$ exist within a single IPS panel in which the thickness of liquid crystal 7 is uniform as shown in FIG. 14. FIG. 14 is a sectional explanatory view showing problematic points of a conventional IPS panel, and reference numerals as used therein are identical with those of FIGS. 11, 12 and 13. In this description, the thickness of the liquid crystal layer of pixel portions which are governed by the primary spacers 8 in convex portion of uneveness on the TFT portions 3 is defined as $d_{max}$ (indicating pixels on both sides of the convex portion and the larger one is defined as $d_{max}$), and the thickness of the liquid crystal layer of pixel portions which are governed by the primary spacers 8 in a concave portion of uneveness on the pixel electrodes 2 is defined as $d_{min}$. The value of $d_{max}-d_{min}$ of a TFT array substrate, which difference in height of the convex portions on the TFT portions 3 and the depth of the concave portions on the pixel electrodes 2 was approximately 1 μm, was approximately 0.8 μm.

In a general IPS mode, the retardation ($\Delta n$)·d is set to be 275 nm. In our studies, it has been found that display deficiencies occurred in case retardation ($\Delta n$)·($d_{max}-d_{min}$) was different by not less than 20 nm. The $\Delta n$ of liquid crystal generally used in an IPS mode is 0.05 to 0.15. That is, in case $d_{max}-d_{min}$ is not less than 0.8 μm, ($\Delta n$)·($d_{max}-d_{min}$) is in the range between 40 to 120 nm and thus causes display deficiencies as already described. Thus, $d_{max}-d_{min}$ is required to be not more than 0.4 μm in order to make ($\Delta n$)·($d_{max}-d_{min}$) to be not more than 20 nm.

As described, variations in thickness of liquid crystal 7 caused irregularities in colors in conventional arrangements of IPS panels, and thus caused deficiencies in display property of display.

Further, since difference in height of the convex portion of the TFT array substrate and the depth of the pixel electrode was approximately 1 μm in a conventional arrangements of TFT array substrates 1 which was formed on the TFT array substrate 1 which was due to arrangements of the TFT portions or pixel electrodes. Thus, the spherical shape of secondary spacers 10 contained in the seal member 9 and the diameter of primary spacers 8 dispersed within the display surface could not be accurately set. Therefore, variations in dispersing processes of secondary spacers 10 and primary spacers 8 caused differences in the thickness $d_{min}$ of the liquid crystal 7 in the proximity of the seal member 9 and in the thickness dmax of the liquid crystal 7 in the central portion of the display surface, whereby display deficiencies were generated.

The present invention has been made with the aim of solving the above described problems, and it is an object of the present invention to provide an IPS panel of favorable display property by eliminating variations in colors which were due to uneveness in thickness of the liquid crystal layer which existed in conventional arrangements of IPS panels.

SUMMARY OF THE INVENTION

The liquid crystal display apparatus according to Claim 1 of he present invention is a liquid crystal display apparatus comprised of a FT array substrate on which there are formed on a substrate scanning signal lines, image signal lines, thin film transistors formed at each intersection of the scanning signal lines and image signal lines, liquid crystal driving electrodes connected to the thin film transistors, common electrodes formed such that at least a part of them are opposing the liquid crystal driving electrodes, and common signal lines for writing in signals to the common electrodes, a counter substrate which opposes the TFT array substrate, a plurality of primary spacers for maintaining a gap between the TFT array substrate and the opposing substrate constant, a plurality of secondary spacers for maintaining a gap between peripheral portions of the TFT array substrate and the counter substrate constant, a sealing agent which is interposed in the gap between the TFT array substrate and counter substrate together with the secondary spacers and which adhere the TFT array substrate and counter substrate at the peripheral portions, and a liquid crystal layer pinched and held between the array substrate and counter substrate, the liquid crystal layer presenting bifringence effects, wherein an in-plane retardation of the display apparatus $(\Delta n)\cdot(d_{max}-d_{min})$ is not less than 0 nm and not more than 20 nm in case the largest gap of gaps between the liquid crystal driving electrodes and opposing substrates within the display surface of the liquid crystal display is denoted $d_{max}$, and the smallest gap within the display surface of the liquid crystal display dmin.

In the liquid crystal display apparatus according to Claim 2 of the present invention, the primary spacers is of spherical shape, and the secondary spacers is of columnar shape, whereby they are easily available and present desired dimensional accuracy, and is thus favorable.

The liquid crystal display apparatus according to Claim 3 of the present invention is a liquid crystal display apparatus comprised of a TFT array substrate on which there are formed on a substrate scanning signal lines, image signal lines, thin film transistors formed at each intersection of the scanning signal lines and image signal lines, liquid crystal driving electrodes connected to the thin film transistors, common electrodes formed such that at least a part of them are opposing the liquid crystal driving electrodes, and common signal lines for writing in signals to the common electrodes, a counter substrate which opposes the TFT array substrate, a plurality of primary spacers for maintaining a gap between the TFT array substrate and the counter substrate constant, a plurality of secondary spacers for maintaining a gap between peripheral portions of the TFT array substrate and the counter substrate constant, a sealing agent which is interposed in the gap between the TFT array substrate and counter substrate together with the secondary spacers and which adhere the TFT array substrate and counter substrate at the peripheral portions, and a liquid crystal layer pinched and held between the array substrate and counter substrate, the liquid crystal layer presenting bifringence effects, wherein an organic film is provided on the TFT array substrate having a thickness of not less than 3 μm and not more than 10 μm.

In the liquid crystal display apparatus according to Claim 4 of the present invention, the liquid crystal driving electrodes and common electrodes are formed on the organic film, whereby driving voltages for the liquid crystal panel can be made low, and is thus favorable. That is, while planation films are arranged on conventional TFT array substrates, contact holes are formed on the planation film for contact with one side of the TFTs and comb-like electrodes. Comb-like electrodes on the other side are provided with contact holes for contact with the common electrodes. That is, by providing the comb-like electrodes on the organic film for flatting, voltage loss due to the organic film can be prevented and an even greater electric field can be applied to the liquid crystal.

In the liquid crystal display apparatus according to Claim 5 of the present invention, in case unevenness of an in-plane film of the organic film that is parallel to the TFT array substrate are expressed as concave portions/convex portions, an absolute value for a height obtained by subtracting the concave portion from the convex portion is not more than 0.4 μm, whereby the retardation can be made to be not less than 0 nm and not more than 20 nm, and is thus favorable.

In the liquid crystal display apparatus according to Claim 6 of the present invention, the primary spacers are of spherical shape, and the secondary spacers are of columnar shape, whereby they are easily available and present desired dimensional accuracy, and is thus favorable.

In the liquid crystal display apparatus according to Claim 7 of the present invention, a diameter of the secondary spacers is a sum of a thickness of a coloring layer provided on the opposing substrate and of a diameter of the primary spacers, whereby the gap between the TFT array substrate and opposing substrate can be made constant, and is thus favorable.

In manufacturing the TFT array substrate as employed in the liquid crystal display apparatus according to Claim 8 of the present invention, the organic film is formed as a flatting film by applying organic resin having a viscosity of not less than 15 cP and not more than 50 cP onto the surface of the TFT array substrate by spin coat method at a rotational speed of not less than 500 rpm and not more than 2,000 rpm, whereby the film thickness of the flatting film can be easily set to be not less than 3 μm and not more than 10 μm, and is thus favorable.

In manufacturing the TFT array substrate as employed in the liquid crystal display apparatus according to Claim 9 of the present invention, the organic resin is one selected from photosensitive acrylic resin and acrylic resin, whereby film forming can be performed when the TFT array is manufactured, and is thus favorable.

In manufacturing the TFT array substrate as employed in the liquid crystal display apparatus according to Claim 10 of the present invention, the thickness of the flatting film is set to be not less than 3 μm and not more than 10 μm, whereby variations in thickness of the film can be made to be not more than 0.4 μm.

The arrangement and manufacturing method of the liquid crystal display apparatus according to the present invention will now be explained in details with reference to the drawings.

BRIEF DESCRIPTION OF THE DRAWINGS

FIG. 2 is a sectional explanatory view showing an IPS panel of EMBODIMENT 1 of the present invention;

FIGS. 3(a) and 3(b) are sectional explanatory views showing, as a flowchart, manufacturing process of a TFT array substrate employed in the IPS panel of EMBODIMENT 1 of the present invention;

FIG. 6 is a sectional explanatory view showing an IPS panel of EMBODIMENT 2 of the present invention;

FIG. 7 is a plan explanatory view showing a single pixel of IPS panel of EMBODIMENT 2 of the present invention;

FIGS. 8(a) and 8(b) are sectional explanatory views showing, as a flowchart, manufacturing process of a TFT array substrate employed in the IPS panel of EMBODIMENT 2 of the present invention;

FIG. 14 is a sectional explanatory view showing a problem of the conventional IPS panel.

DETAILED DESCRIPTION

Figure 1:
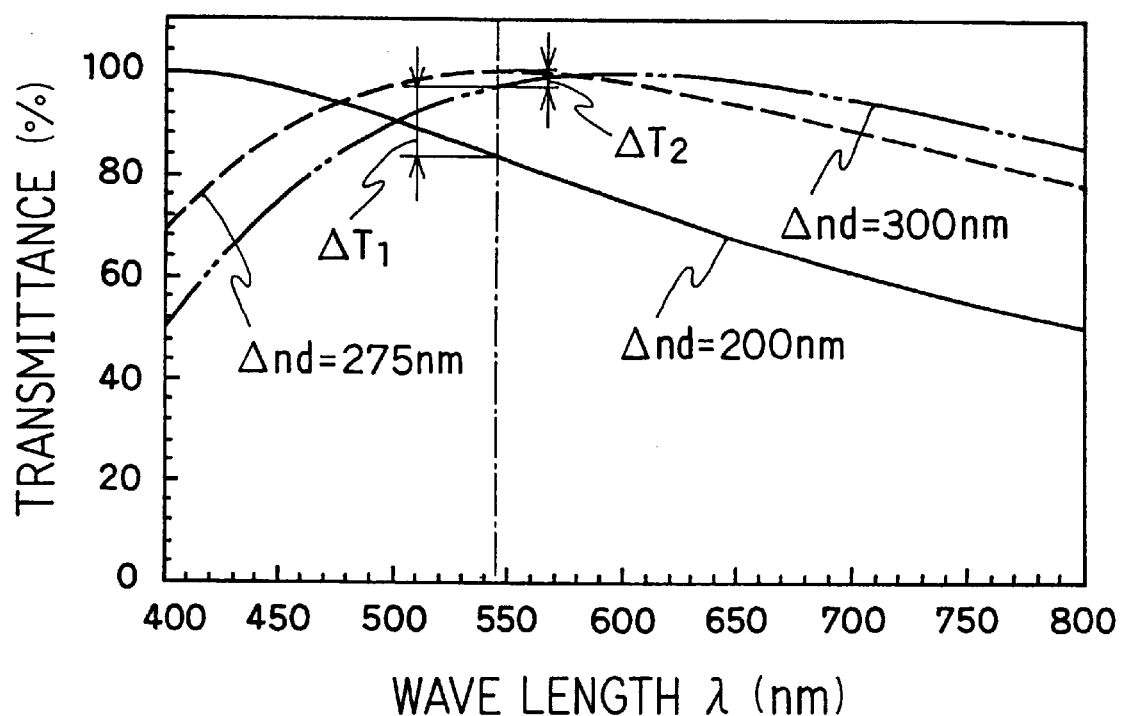
FIG. 1 is a graph according to EMBODIMENT 1 of the present invention showing dependency of transmittance on wavelength in IPS modes.

Embodiments of the liquid crystal display apparatus of the present invention will now be explained.

EMBODIMENT 1

The arrangement of the IPS liquid crystal display apparatus according to the present embodiment will first be explained. The IPS liquid crystal display apparatus according to the present embodiment is mainly comprised of, similarly to conventional ones, a TFT array substrate, a counter substrate, a sealing agent, spacers (secondary spacers) and a liquid crystal layer. Spacers will be discussed in details later. The TFT array substrate is a substrate made, for instance, of glass provided with scanning signal lines, image signal lines, TFTs and liquid crystal driving electrodes which are arranged in a form of an, and there are further arranged common electrodes and common signal lines. The scanning signal lines are arranged in that a plurality thereof are arranged at equal intervals and in a parallel manner, and the image signal lines in that a plurality thereof are arranged at equal intervals and in a parallel manner and further as to be orthogonal to the scanning signal lines via an insulating film. TFTs are respectively arranged at each intersection at which the scanning signal lines and image signal lines intersect, to each of which a liquid crystal driving electrode is connected. The common electrodes are arranged in that at least a part thereof are formed to oppose and to be parallel with respect to the liquid crystal driving electrodes, and common signal lines for writing in signals to the common electrodes are disposed vertical with respect to the common electrodes. It should be noted that at least a part of the common electrodes and common signal lines intersect, and are arranged in that signals may be written in through these intersections. The counter substrate is disposed as to oppose the TFT array substrate, and the counter substrate is formed with coloring layers of red, green and blue as well as a protecting film for preventing these coloring layers from melting to the liquid crystal layer.

For maintaining a predetermined gap between the TFT array substrate and the counter substrate in regions formed with liquid crystal driving electrodes constant, there are interposed primary spacers in these regions between the TFT array substrate and the counter substrate.

The primary spacers are of spherical shape having a diameter of approximately 5 μm, and a plurality of these are used which are made of synthetic resin. The reason for using those made of plastic is that spacers of plastic are comparatively soft and do not damage the TFT elements. Alternatively, materials of the silica ($SiO_2$) may be selected. Dimensional variations are approximately 0.3 μm (average deviation), whereby the gap between the TFT array substrate and opposing substrate can be maintained constant. The amount of primary spacers that is to be dispersed into the gap between the TFT array substrate and counter substrate is suitably selected for achieving a desired uniformity for the gap. Such spherical spacers are easily available and are effective in achieving a desired dimensional accuracy.

A plurality of secondary spacers are employed which may be of columnar, strip-like or spherical shape. In view of costs thereof, it is often the case that spacers of glass are employed. In any case, they are easily available and are effective in achieving a desired dimensional accuracy. While materials for the primary spacers are selected from materials which are soft and do not damage the TFT elements, those for the secondary spacers are selected from hard ones.

The sealing agent is for adhering the TFT array substrate and counter substrate together at their peripheral portions while maintaining a predetermined gap therebetween, and secondary spacers are interposed in the seal member for maintaining a predetermined gap between the TFT array substrate and counter substrate at their peripheral portions constant, and the TFT array substrate and counter substrate are adhered together. In this gap of a predetermined interval, a liquid crystal layer characteristics of liquid crystal having bifringence is interposed and held. Polarizers are arranged in the upper side of the TFT array substrate and in the lower side of the counter substrate.

Considerations of a relationship between visual recognition of irregularities in colors and transmittance of light corresponding to each color will now be explained which is a technical background which has enabled the IPS liquid crystal display apparatus of the present invention.

FIG. 1 is a graph according to EMBODIMENT 1 of the present invention showing dependency of transmittance on wavelength in IPS modes which have been confirmed through simulations performed by the inventors of the present invention. The vertical axis represents wavelength λ(nm), and the lateral axis transmittance (%). Here, dependence of transmittancy on wavelength are shown in case values for retardation (Δn)·d are 200, 275, and 300 nm, respectively. In case (Δn)·d differed by 100 nm, a difference $\Delta T_1$ in transmittance by approximately 18% was generated in case of wavelength of green light (544 nm). A difference by 25 nm caused a difference $\Delta T_2$ in transmittance by approximately 8%. Wavelength of high luminosity to the human eye range in the proximity of 550 nm. Thus, it is important in general displays that few variations occur in the transmittance of green light. Our inventors have found out that irregularities of colors on the display were recognized in case the transmittance of green light differs by 5% or more. In order to keep such differences in transmittance of light of colors within 5%, variations in retardation values generated in the panel surface are required be not more than 20 nm $(\Delta n) \cdot (d_{max} - d_{min}) \leq 20$ nm, wherein dmax is the thickness of the liquid crystal layer governed by the primary spacers 8 in convex portions of unevenness on TFT portions 3, and dmin is the thickness of the liquid crystal layer which is dependent on the spherical sizes of the primary spacers 8 in concave portions of unevenness on pixel electrodes 2). The Δn of liquid crystal materials employed in the IPS mode is in the range of 0.05 to 0.15. Therefore, $(d_{max}-d_{min}) \leq 0.4$ μm needs to be satisfied.

From the above facts, it can be understood that the retardation of the IPS panel needs to satisfy $0 \leq (\Delta n) \cdot (d_{max}-d_{min}) \leq 20$ nm, that is, variations in gaps within the panel surface needs to satisfy $d_{max}-d_{min} \leq 0.4$ μm in order to manufacture an IPS panel without irregularities in colors.

Next, an example of an IPS panel for realizing EMBODIMENT 1 will be shown. FIG. 2 is a sectional explanatory view of the IPS panel according to EMBODIMENT 1 of the present invention. In FIG. 2, reference numerals 1 to 10, 17 and 18 are identical with those as shown in FIGS. 11 to 14 which show arrangements of the prior art, and reference numeral 100 denotes an IPS panel according to the present embodiment. Further, numeral 16 denotes a flatting film for eliminating concave portions/convex portions on the TFT array substrate 1. In the drawings, the liquid crystal driving electrodes and the common electrodes and image signal lines are formed to be opposing each other on the TFT array substrate 1, and the region on which the liquid crystal driving electrodes and the common electrodes and image signal lines are formed to be opposing each other is called a display region.

Figure 4A:
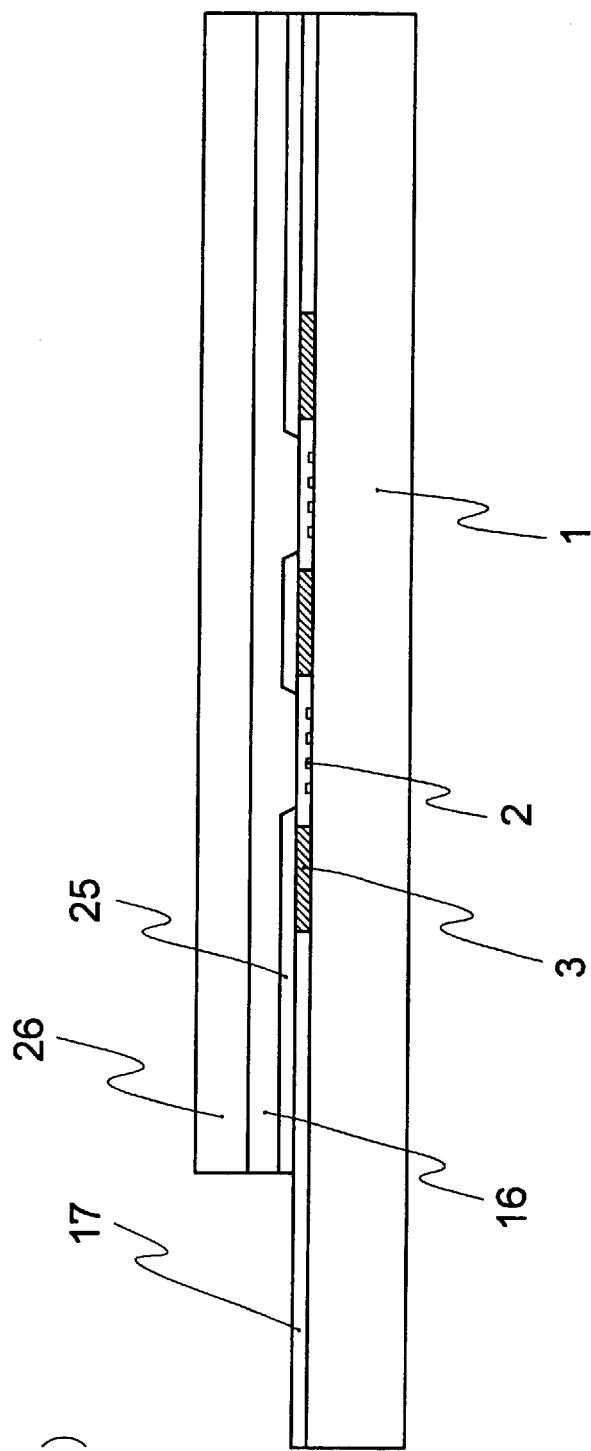
FIGS. 4(a) and 4(b) are sectional explanatory views showing, as a flowchart, manufacturing process of a TFT array substrate employed in the IPS panel of EMBODIMENT 1 of the present invention.
Figure 4B:
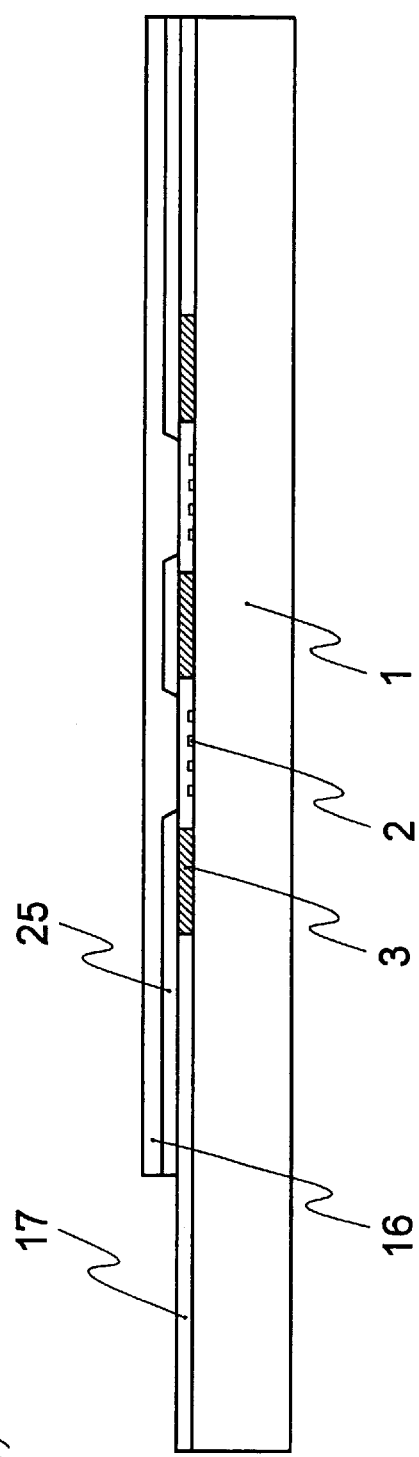
Figure 5A:
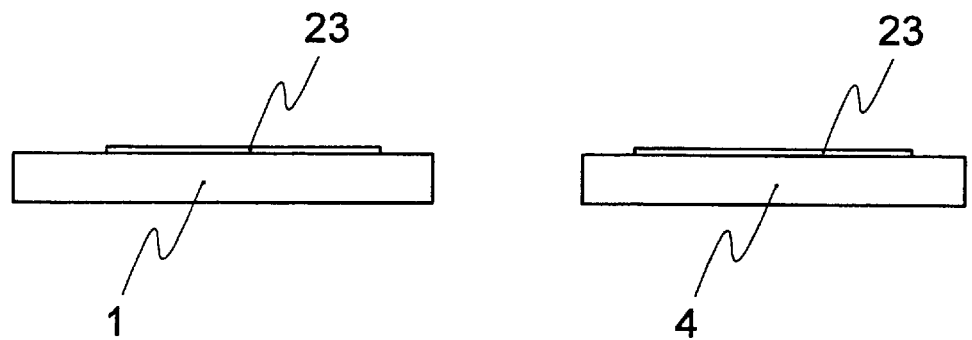
FIGS. 5(a) to 5(c) are sectional explanatory views showing, as a flowchart, manufacturing process of a TFT array substrate employed in the IPS panel of EMBODIMENT 1 of the present invention.
Figure 5B:
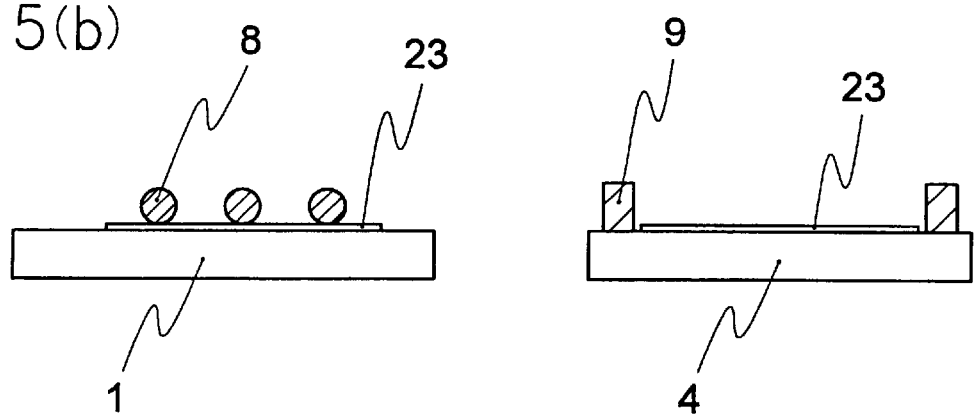
Figure 5C:
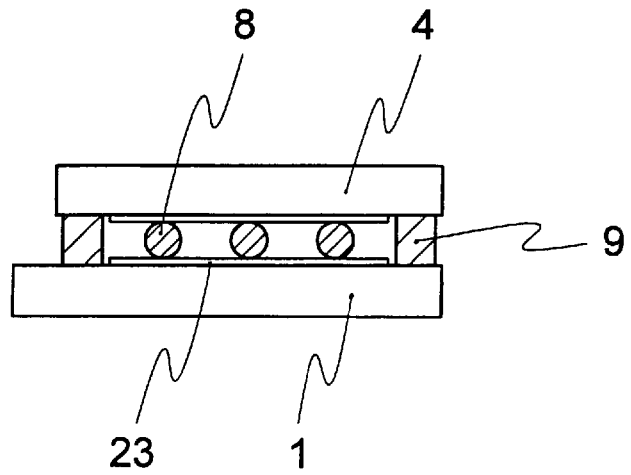

FIGS. 3(a), 3(b), 4(a) and 4(b) are sectional explanatory views showing, as a flowchart, manufacturing processes of a TFT array substrate employed in the IPS panel as shown in FIG. 2. Further, FIGS. 5(a), 5(b) and 5(c) are sectional explanatory views showing, as a flowchart, manufacturing processes of the IPS panel as shown in FIG. 2. In Step 1, a TFT array substrate 1 for a known IPS panel was prepared as shown in FIG. 3(a). Then, in Step 2, a flatting film 16 was applied on the surface of the TFT array substrate 1 through spin coat method to assume a thickness of not less than 3 μm and not more than 10 μm. The flatting film 16 is of an organic film of, for instance, photosensitive acrylic resin or of acrylic resin. It has been found that a desired thickness can be obtained in case application is performed by using a spinner wherein the viscosity is not less than 15 cP and not more than 50 cP, preferably around 30 cP, and the rotational speed is not less than 500 rpm and not more than 2,000 rpm, and preferably 800 rpm. The reason for setting the viscosity to not less than 15 cP is that a viscosity smaller than this can not present sufficient viscosity whereby the thickness after application is too thin and the variation in thickness becomes large, and for setting the viscosity to not more than 50 cP that in case the viscosity is larger than this, the viscosity becomes too large and uniformity in film decreases. Further, the reason for setting the revolution speed to not less than 500 rpm and not more than 2,000 rpm is that a desired thickness and variation in film thickness can be realized when in this range. The inventors have confirmed that application can be performed while the difference between the maximum in-plane film thickness tmax and the minimum in-plane film thickness tmin is not more than 0.4 μm under such conditions for application. In other words, the inventors have confirmed that application which satisfies $t_{max}-t_{min} \leq 0.4$ μm can not be realized unless thickness of the planation film 16 is not less than 3 μm. After applying the flatting film 16, resist 26 was applied. This resist 26 may be any resist as employed in general photolithography techniques. In the following Step 3, the electrodes 17 were exposed through exposure and developing as shown in FIG. 4(a), and in Step 4, the TFT array substrate having a shape as shown in FIG. 4(b) was obtained.

The IPS panel was manufactured through steps as shown in FIGS. 5(a) to 5(c) by using the TFT array substrate 1 and counter substrate 4 as formed in the above processes. In Step 1, alignment layer 23 were formed on the TFT array substrate 1 and the counter substrate 4 for aligning liquid crystal 7 on the substrate surfaces as shown in FIG. 5(a). Generally, transferring methods are taken for such applications. The thickness is preferably in the range of 500 to 1,500 Å. Polyimide is favorably used as a material thereof, and any alignment layer for TN (twisted nematic) liquid crystal may be used. The alignment process can be easily performed through known rubbing methods. The rubbing direction is set to be the aligning direction as explained in the theory of conventional IPS modes (see FIG. 13). Then, in Step 2, primary spacers 8 were dispersed on the TFT array substrate 1 as shown in FIG. 5(b), and a sealing agent 9 mixed with secondary spacers was applied onto the counter substrate 4 as shown in FIG. 5(b) (note that spacers 10 have been omitted in the drawings, and reference should be made to the arrangement of FIG. 2). For the application, methods such as screen printing, dispensing or transferring are generally employed. As for the material for the seal member 9, thermosetting epoxy resin or UV curing resin is generally used. Lastly, in Step 3 as shown in FIG. 5(c), overlapping was performed by opposing the alignment layers of the TFT array substrate 1 and counter substrate 4 which have been treated in the above processes, and compression through heat or ultraviolet light was performed to form a panel. By performing enclosing of liquid crystal, the IPS panel was obtained. It should be noted that for detailed arrangements of the IPS panel after completion, one should refer to FIG. 2.

In the arrangement of the IPS panel according to this embodiment and as shown in FIG. 2, a flatting film 16 was applied on a conventional TFT array substrate 1 to assume a thickness of not less than 3 μm and to satisfy $t_{max}-t_{min} \leq 0.4$ μm, whereby in-plane uniformity of liquid crystal 7 could be achieved. In this manner, the retardation of the panel in-plane $(\Delta n) \cdot (d_{max}-d_{min})$ could be made to be not more than 20 nm. With this arrangement, irregularities in color which occurred on conventional IPS panels could be eliminated and an IPS panel of high display quality as a display could be manufactured.

EMBODIMENT 2

FIG. 6 is a sectional explanatory view of an IPS panel according to Embodiment 2 of the present invention. FIG. 7 is a plan explanatory view of a single pixel of the IPS panel for explaining the second embodiment of the present invention. In FIGS. 6 and 7, reference numeral 200 denotes an IPS panel according to this embodiment, and reference numerals 1 to 14, 17 and 18 are identical with those as shown in explanatory views related to EMBODIMENT 1 as well as the prior art. 16 denotes a flatting film as explained in EMBODIMENT 1. Further, 19 denotes contact holes for providing contact between drain portions of TFTs 14 and the liquid crystal driving electrodes 21 or between the common signal lines 13 and the common electrodes 22.

Figure 9:
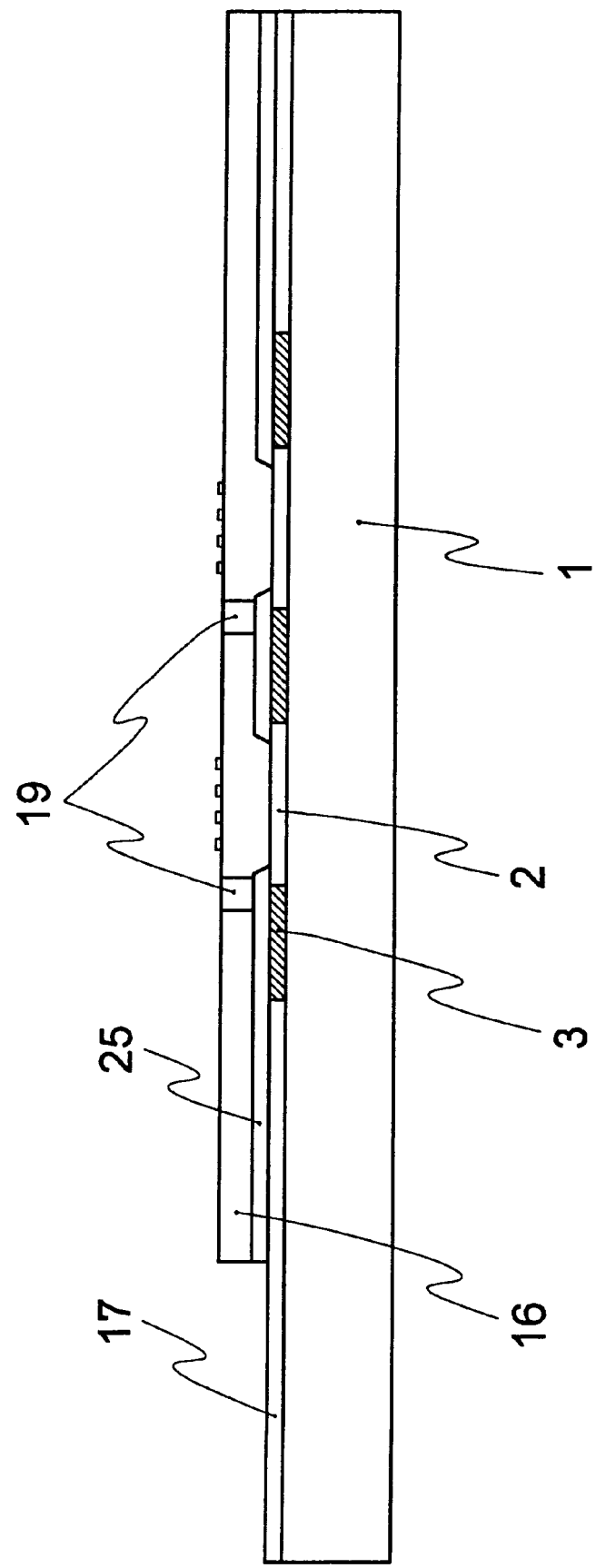
FIG. 9 is a sectional explanatory view showing an IPS panel of EMBODIMENT 2 of the present invention.

Manufacturing methods for the liquid crystal panel as shown in FIG. 6 will be explained based on FIGS. 8(a), 8(b) and 9. FIGS. 8(a), 8(b) and 9 are sectional explanatory views showing, as a flowchart, manufacturing processes of an IPS panel according to EMBODIMENT 2. The reference numerals used herein are identical with those as used in explanatory views related to EMBODIMENT 1 and the prior art. This embodiment differs from the former only in that the shape of the TFT array substrate 1 is different, and all other arrangements are identical to those of EMBODIMENT 1, so than only the manufacturing method for the TFT array substrate 1 will be explained in here, and other factors of manufacturing are identical to those as described in EMBODIMENT 1. In Step 1 as shown in FIG. 8(a), scanning signal lines 11, image signal lines 12, common signal lines 13, TFTs 14, and electrodes 17 were formed on a glass substrate, similarly to conventional manufacturing methods of TFT array substrates. That is, the difference between EMBODIMENT 1 and the present one lies in the point that no pixel electrodes 2 are formed in Step 1. Then, in Step 2, a flatting film 16 was formed on the substrate surface through spin coat method to assume a thickness of approximately 3 $\mu$m, as shown in FIG. 8(b). Forming methods of the flatting film 16 were identical with those of EMBODIMENT 1. Thereafter, etching of the flatting film 16 on the electrodes 17 was performed through photolithography, and contact holes 19 were formed. Then, in Step 3, pixel electrodes 2 were formed on the flatting film 16 as shown in FIG. 9. Materials suitably used for the pixel electrodes 2 are electric conductors such as chrome, aluminum or ITO in a form of a thin film. It is preferable that the forming method be spattering or evaporation. After forming the thin film of electric conductors, electrodes of shapes as shown in FIG. 7 were formed through photolithography method. At this time, the liquid crystal driving electrodes 21 and the TFTs 14 as well as the common electrodes 22 and the common signal lines 13 were respectively connected through the contact holes 19 as shown in FIGS. 7 and 9 related to Step 3.

By adhering the TFT array substrate 1 thus obtained to the counter substrate 4 as shown in EMBODIMENT 1, an IPS panel was obtained.

Since pixel electrodes 2 were formed in lower portions of the flatting film 16 in EMBODIMENT 1, losses in effective voltage applied to the liquid crystal were generated. Therefore, the voltage for driving the liquid crystal 7 was required to be high, whereby electricity consumption of the IPS panel was made large.

In the arrangement of the IPS panel as shown in FIGS. 6 and 7, the pixel electrodes 2 are disposed at portions at which they contact the liquid crystal 7, whereby more voltage can be applied to the liquid crystal 7 than compared to the arrangement of the IPS panel of EMBODIMENT 1. Further, the provision of a planation film 16 makes it possible to present similar effects as presented by the IPS panel of EMBODIMENT 1.

With this arrangement, irregularities in color which occurred on conventional IPS panels could be eliminated and an IPS panel of high display quality as a display could be manufactured.

EMBODIMENT 3

Figure 10:
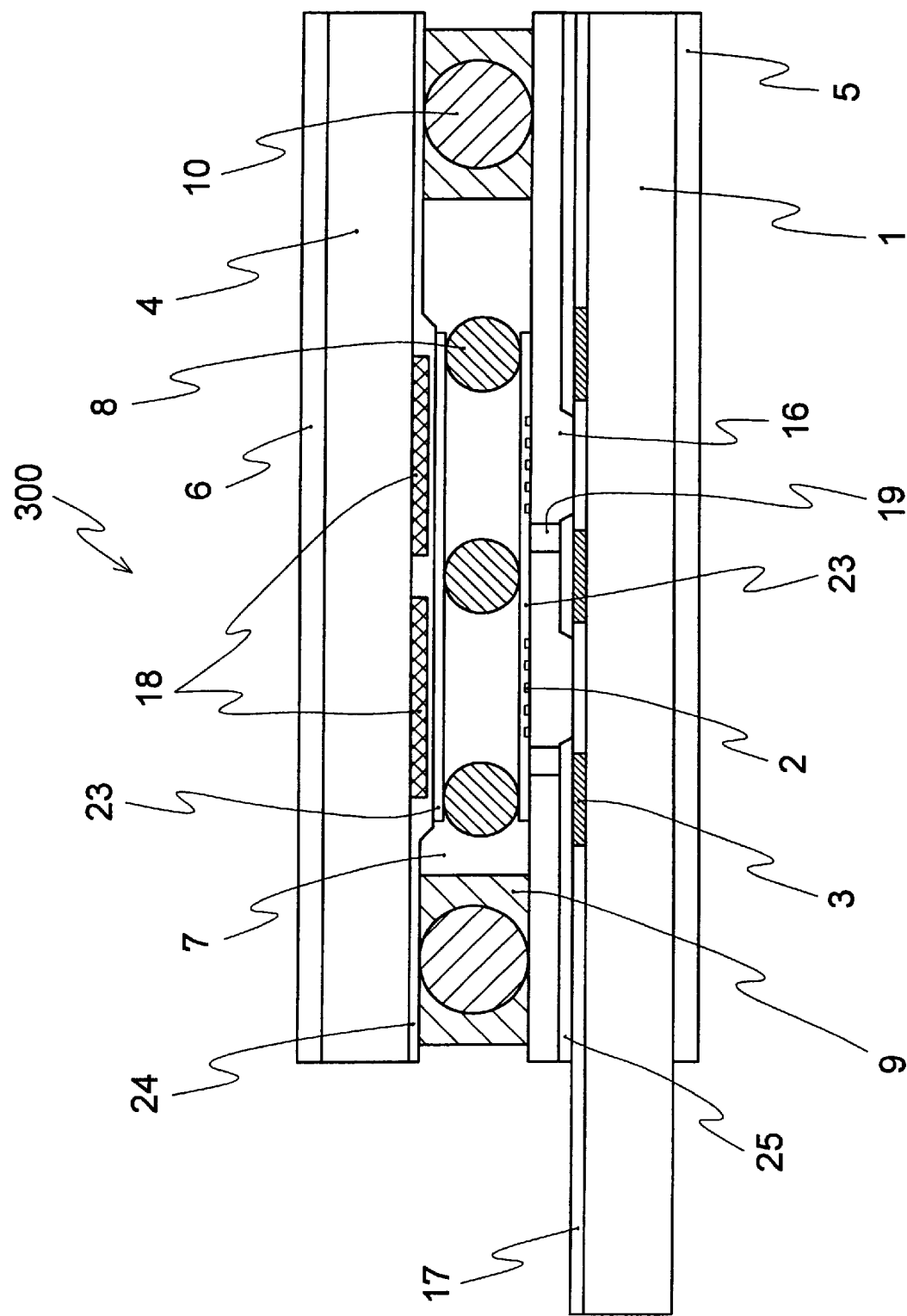
FIG. 10 is a sectional explanatory view showing IPS panel of the present invention.
Figure 11:
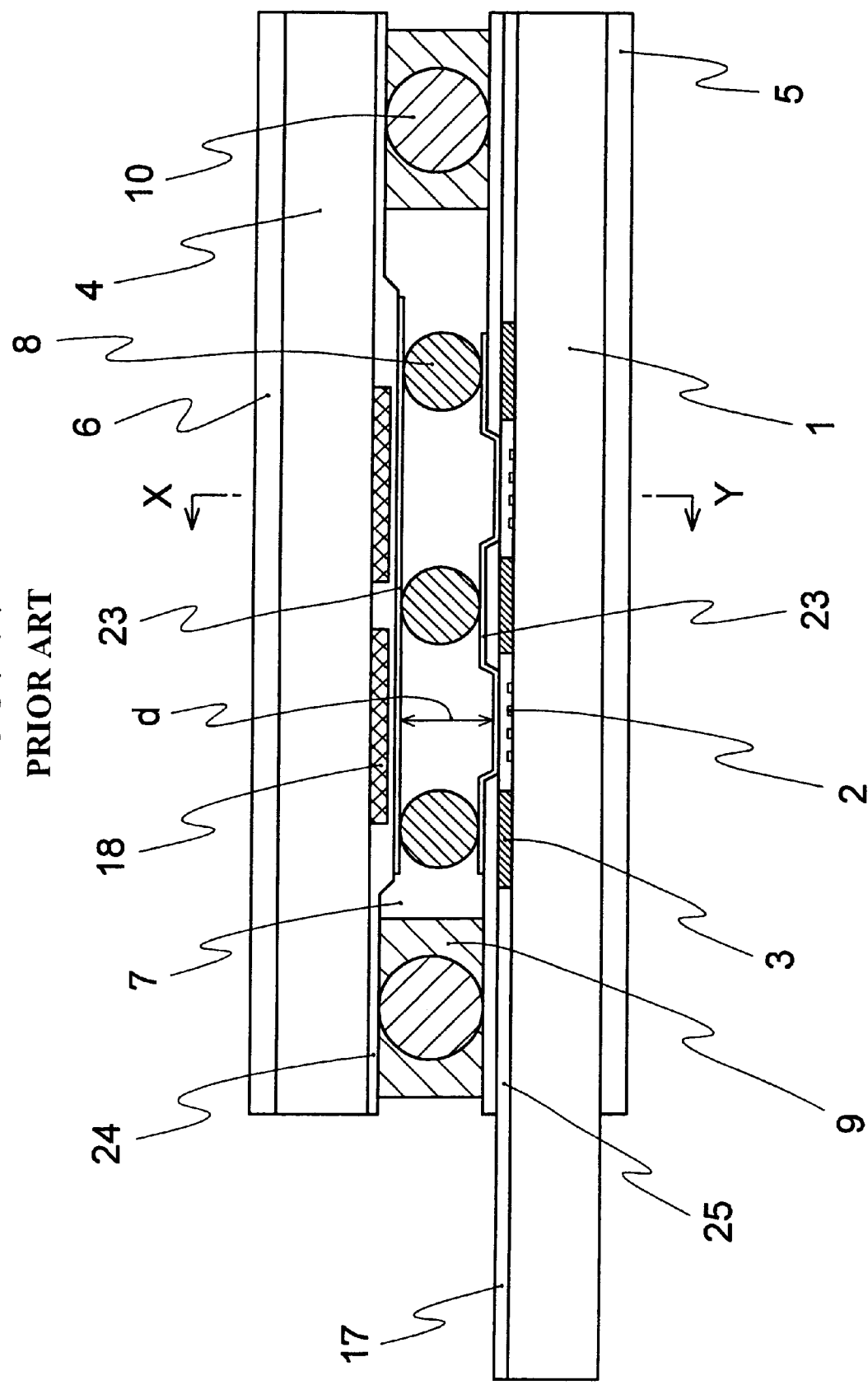
FIG. 11 is a sectional explanatory view showing a conventional IPS panel.
Figure 12:
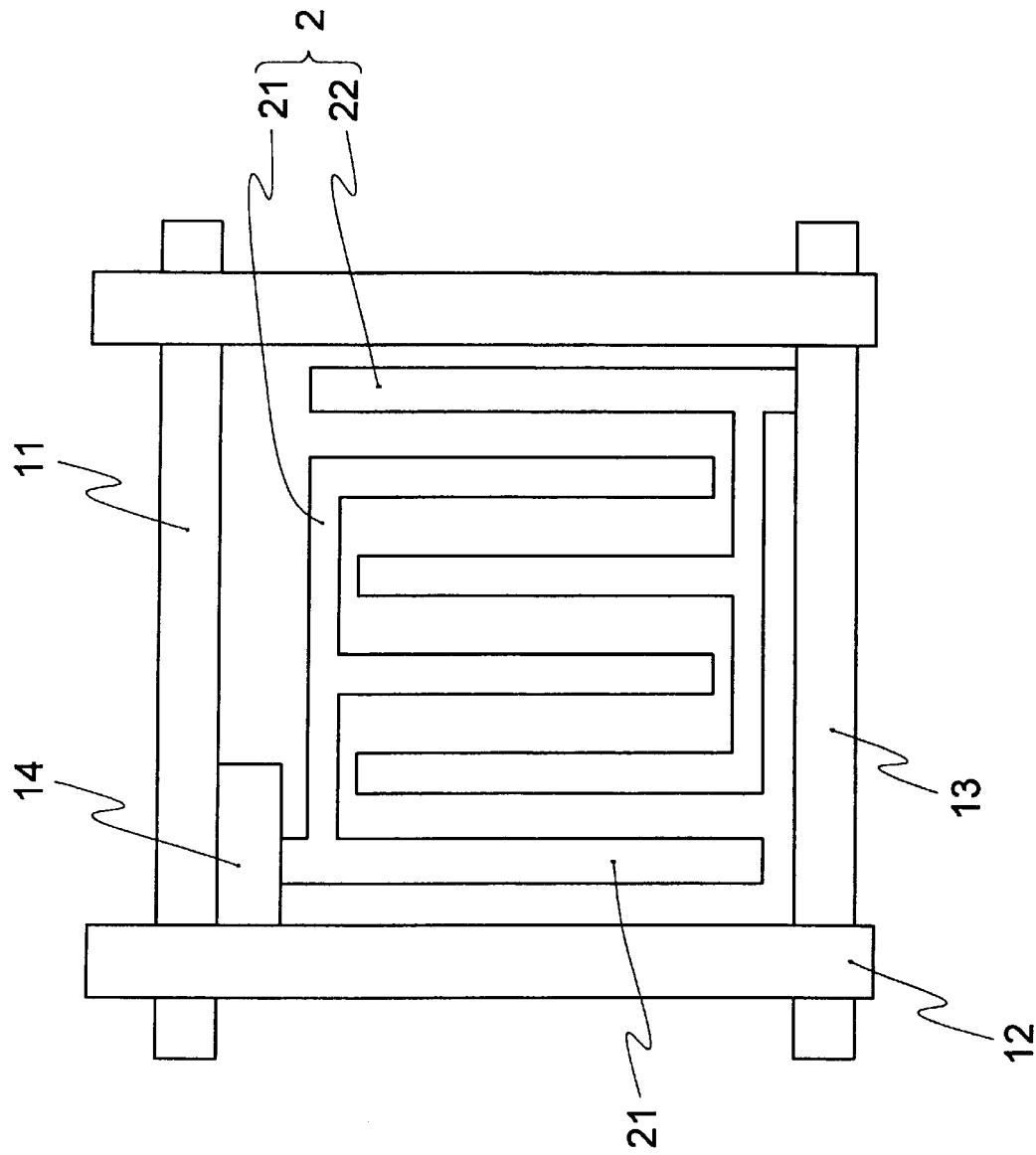
FIG. 12 is a plan explanatory view showing a single pixel of conventional IPS panel.
Figure 13:
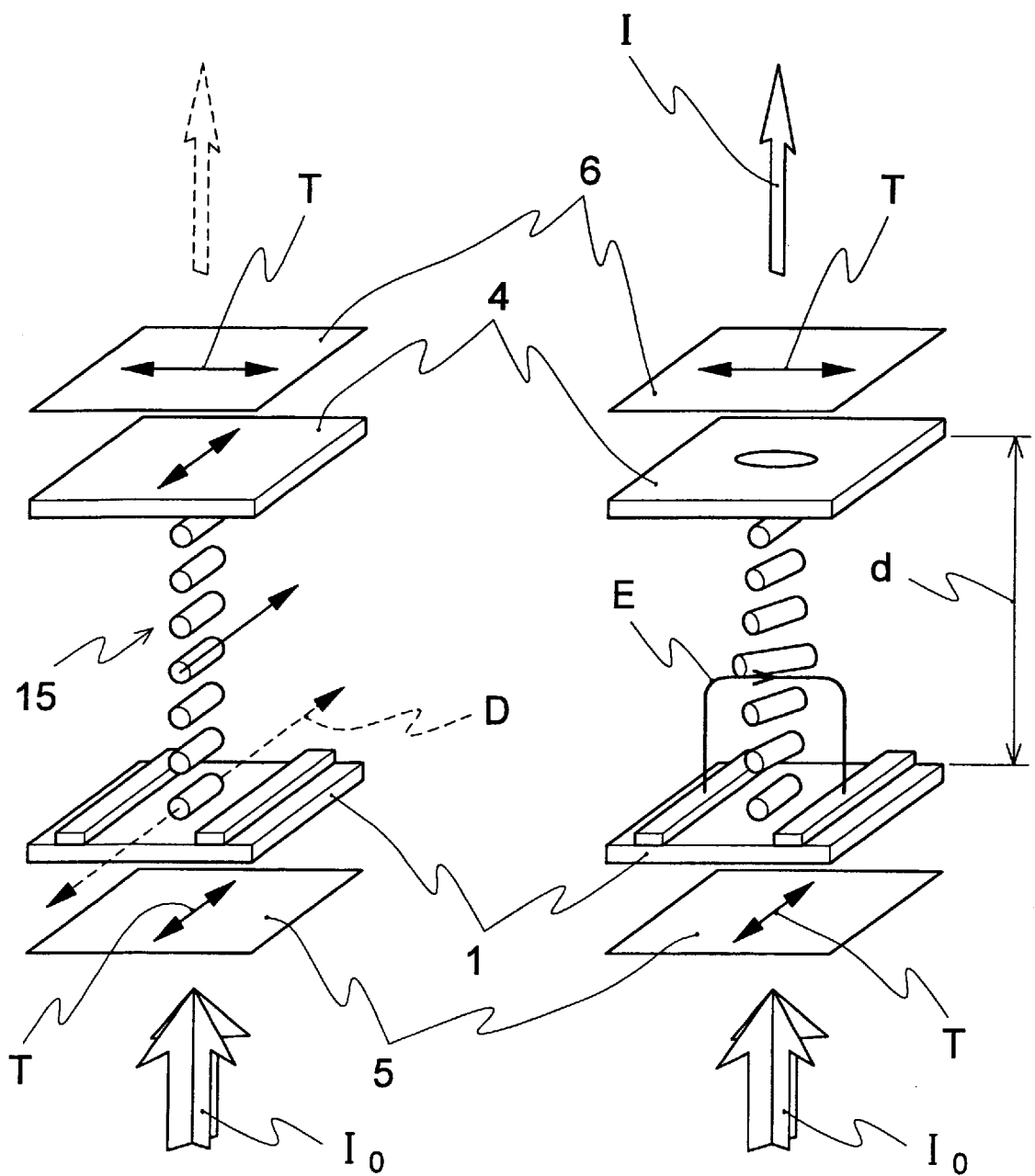
FIG. 13 is a sectional explanatory view taken along line X—X in FIG. 11.

FIG. 10 is a sectional explanatory view of an IPS panel according to EMBODIMENT 3 of the present invention. In the drawings, reference numeral 300 denotes an IPS panel according to this embodiment, and all other reference numerals are identical with those as shown in explanatory views related to EMBODIMENT 1 and EMBODIMENT 2. Composing materials for the IPS panel are identical with those as described in EMBODIMENT 1 and EMBODIMENT 2 (in FIG. 10, materials as used in FIG. 6 of EMBODIMENT 2 were employed). Here, spherical diameters of primary spacers 8 dispersed in the display region and secondary spacers 10 mixed with the sealing agent 9 will be explained.

The diameter of the primary spacers 8 was defined as $D_1$, and the diameter of the secondary spacers 10 as $D_2$. The thickness of the coloring layer 18 of the counter substrate was defined as a. In the arrangement of IPS panels 100 or 200 as shown in EMBODIMENT 1 and EMBODIMENT 2, planation of the TFT array substrate 1 was achieved through the flatting film 16, so that the diameter of the spacers 10 in the sealing agent could be set by the following equation.

$$D_2 = D_1 + a$$

In arrangements of conventional TFT array substrates 1, unevenness in which difference in height of the TFT array substrate and depth of the pixel electrodes is approximately 1 $\mu$m were generated on the TFT array substrate 1 due to arrangements of the TFT portions 3 or pixel electrodes 2, and display deficiencies owing to the unevenness were generated. In the present embodiment, a diameter for the secondary spacers 10 contained in the sealing agent 9 and a diameter for the primary spacers 1 that are dispersed in the display in-plane can be precisely set.

Conventionally, unevenness in which difference in height of the TFT array substrate and depth of the pixel electrodes is approximately 1 $\mu$m were generated in the display region of the TFT array substrate 1, and the unevenness also existed in a region on which the sealing agent was formed which are due to scanning signal lines or image signal lines. As shown in FIG. 14, flatting of the TFT array substrate is performed in the present embodiment through the flatting film, and the diameter of spacers can be determined by the above mentioned equation. In manufacturing processes, it may happen that the compressing pressure controlling the gap between the substrates may vary, or that processes for dispersing the primary spacers vary. The IPS panel according to the present embodiment can be manufacturing by assembling the TFT array substrate and counter substrate at high accuracy regardless of variations in unevenness on the TFT array substrate or in changes processing conditions occurring in assembling processes to complete the same as a liquid crystal panel. With this arrangement, no variation in the thickness of liquid crystal 7 in the proximity of the sealing agent 9 and the thickness d of liquid crystal 7 in the central portion of the display surface were caused anymore.

By determining the diameters for the secondary spacers 10 contained in the sealing agent as described in this EMBODIMENT 3, no differences were generated in the gap of the panel in the proximity of the sealing agent and in the gap of the in-plane panel. With this arrangement, irregularities in color which occurred on conventional IPS panels could be eliminated and an IPS panel of high display quality as a display could be manufactured.

In the liquid crystal display apparatus according to Claim 1 of the present invention, the in-plane retardation of the display apparatus $(\Delta n) \cdot (d_{max} - d_{min})$ is not less than 0 nm and not more than 20 nm in case the largest gap of gaps between the liquid crystal driving electrodes and counter substrates within the display surface of the liquid crystal display is denoted $d_{max}$, and the smallest gap within the display surface of the liquid crystal display dmin. With this arrangement, irregularities in color can be eliminated, and an IPS panel of high display quality can be manufactured.

In the liquid crystal display apparatus according to Claim 2 of the present invention, the primary spacers are of spherical shape, and the secondary spacers are of columnar shape, whereby they are easily available and present desired dimensional accuracy.

In the liquid crystal display apparatus according to Claim 3 of the present invention, an organic film is provided on the TFT array substrate having a thickness of not less than 3 μm and not more than 10 μm, whereby unevenness on the TFT array substrate can be eliminated.

In the liquid crystal display apparatus according to Claim 4 of the present invention, the liquid crystal driving electrodes and common electrodes are formed on the organic film, whereby driving voltages for the liquid crystal panel can be made low and an IPS panel of low electricity consuming can be obtained.

In the liquid crystal display apparatus according to Claim 5 of the present invention, unevenness in the organic film are not more than 0.4 μm, whereby the retardation can be set to be not less than 0 nm and not more than 20 nm.

In the liquid crystal display apparatus according to Claim 6 of the present invention, the primary spacers are of spherical shape, and the secondary spacers are of columnar shape, whereby they are easily available and present desired dimensional accuracy.

In the liquid crystal display apparatus according to Claim 7 of the present invention, a diameter of the primary spacers is a sum of a thickness of a coloring layer provided on the opposing substrate and of a diameter of the secondary spacers, whereby differences in the gap of the panel in the proximity of the seal member and the gap of the in-plane panel can be eliminated and thus make the gap between the substrates constant, whereby irregularities in color can be eliminated.

In manufacturing the TFT array substrate as employed in the liquid crystal display apparatus according to Claim 8 of the present invention, the organic film is formed as a flatting film by applying organic resin having a viscosity of not less than 15 cP and not more than 50 cP onto the surface of the TFT array substrate by spin coat method at a rotational speed of not less than 500 rpm and not more than 2,000 rpm. With this arrangement, the film thickness of the flatting film can be easily set to be not less than 3 μm and not more than 10 μm, the retardation can be set to be not less than 0 nm and not more than 20 nm, and irregularities in color can be eliminated.

In manufacturing the TFT array substrate as employed in the liquid crystal display apparatus according to Claim 9 of the present invention, the organic resin is one selected from photosensitive acrylic resin and acrylic resin, whereby film forming can be performed when the TFT is manufactured.

In manufacturing the TFT array substrate as employed in the liquid crystal display apparatus according to Claim 10 of the present invention, the thickness of the flatting film is set to be not less than 3 μm and not more than 10 μm, whereby variations in film thickness of the planation film can be easily made to be not more than 0.4 μm.

What is claimed is:

1. An in-plane switching liquid crystal display apparatus comprising:
   a TFT array substrate on which there are formed on a substrate scanning signal lines, image signal lines, thin film transistors formed at each intersection of the scanning signal lines and image signal lines, liquid crystal driving electrodes connected to the thin film transistors, common electrodes formed such that at least a part of them are opposing the liquid crystal driving electrodes, and common signal lines for writing in signals to the common electrodes;
   a counter substrate which opposes the TFT array substrate;
   a plurality of primary spacers for maintaining a constant gap between the TFT array substrate and the opposing substrate;
   a plurality of secondary spacers for maintaining a constant gap between peripheral portions of the TFT array substrate and the counter substrate;
   a sealing agent which is interposed in the gap between the TFT array substrate and counter substrate together with the secondary spacers and which adhere the TFT array substrate and counter substrate at the peripheral portions; and
   a liquid crystal layer pinched and held between the array substrate and counter substrate,
   the liquid crystal layer presenting birefringence effects, wherein an in-plane retardation of the display apparatus $(\Delta n) \cdot (d_{max} - d_{min})$ is not less than 0 nm and not more than 20 nm in case the largest gap of gaps between the liquid crystal driving electrodes and opposing substrates within the display surface of the liquid crystal display is denoted $d_{max}$, and the smallest gap within the display surface of the liquid crystal display dmin.

2. The liquid crystal display apparatus of claim 1, wherein the primary spacers is of spherical shape, and the secondary spacers is of columnar shape.

3. An in-plane switching liquid crystal display apparatus comprising:
   a TFT array substrate on which there are formed on a substrate scanning signal lines, image signal lines, thin film transistors formed at each intersection of the scanning signal lines and image signal lines, liquid crystal driving electrodes connected to the thin film transistors, common electrodes formed such that at least a part of them are opposing the liquid crystal driving electrodes, and common signal lines for writing in signals to the common electrodes;
   a counter substrate which opposes the TFT array substrate;
   a plurality of primary spacers for maintaining a constant gap between the TFT array substrate and the counter substrate;
   a plurality of secondary spacers for maintaining a constant gap between peripheral portions of the TFT array substrate and the counter substrate;
   a sealing agent which is interposed in the gap between the TFT array substrate and counter substrate together with the secondary spacers and which adhere the TFT array substrate and counter substrate at the peripheral portions; and
   a liquid crystal layer pinched and held between the array substrate and counter substrate the liquid crystal layer presenting birefringence effects;
   wherein an organic film is provided on the TFT array substrate having a thickness of not less than 3 μm and not more than 10 μm.

4. The liquid crystal display apparatus of claim 3, wherein the liquid crystal driving electrodes and common electrodes are formed on the organic film.

5. The liquid crystal display apparatus of claim 3, wherein in case unevenness of an in-plane film of the organic film that is parallel to the TFT array substrate are expressed as concave portions and convex portions, an absolute value for a height obtained by subtracting the concave portion from the convex portion is not more than 0.4 μm.

6. The liquid crystal display apparatus of claim 3, wherein the primary spacers are of spherical shape, and the secondary spacers are of columnar shape.

7. The liquid crystal display apparatus of claim 6, wherein a diameter of the secondary spacers is a sum of a thickness of a coloring layer provided on the opposing substrate and of a diameter of the primary spacers.

8. Method for manufacturing a TFT array substrate used for the liquid crystal display apparatus of claim 3 comprising step of:

applying organic resin having a viscosity of not less than 15 cP and not more than 50 cP onto a surface of the TFT array substrate by spin coat method at a rotational speed of not less than 500 rpm and not more than 2,000 rpm, such that organic film is formed as a flatting film.

9. The method of claim 8, wherein the organic resin is one selected from photosensitive acrylic resin and acrylic resin.

10. The method of claim 8, wherein the thickness of the flatting film is set to be not less than 3 $\mu$m and not more than 10 $\mu$m.

11. An in-plane switching liquid crystal display apparatus comprising:

a TFT array substrate on which there are formed on a substrate scanning signal lines, image signal lines, thin film transistors formed at each intersection of the thin film transistors, common electrodes formed such that at least a part of them are opposing the liquid crystal driving electrodes, and common signal lines connected to the common electrodes;

a counter substrate which opposes the TFT array substrate;

a plurality of spacers for maintaining a constant gap between the TFT array substrate and the opposing substrate;

a sealing agent which is interposed in the gap between the TFT array substrate and counter substrate and which adjeres the TFT array substrate and counter substrate at peripheral portions; and a liquid crystal layer pinched and held between the array substrate and counter substrate, the liquid crystal layer presenting bireringence effects, wherein a difference of retardation of the display apparatus between that in a vinicity of the sealing agent ($\Delta n \cdot d_{inner}$) and that in an inner portion of the display apparatus ($\Delta n \cdot d_{inner}$) is not more than 20 nm.

* * * * *